Feb. 21, 1933.   G. R. GAYNE   1,898,121
VEHICLE SPRING SPREADER
Filed Sept. 19, 1931
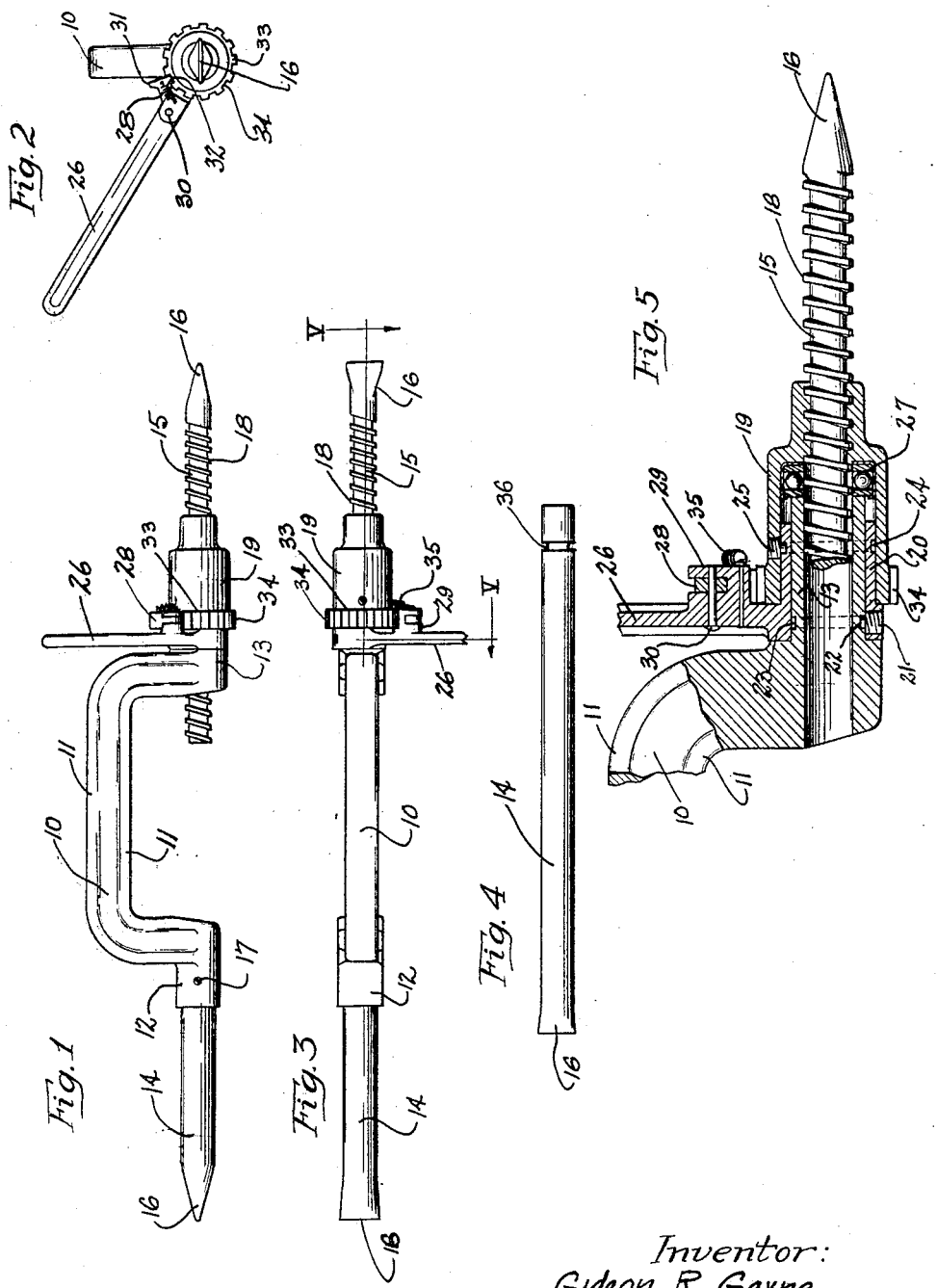
Inventor:
Gideon R. Gayne
By Harry C. Alberts
Atty.

Patented Feb. 21, 1933

1,898,121

UNITED STATES PATENT OFFICE

GIDEON R. GAYNE, OF KENOSHA, WISCONSIN, ASSIGNOR TO SNAP-ON TOOLS, INC., OF KENOSHA, WISCONSIN, A CORPORATION OF DELAWARE

VEHICLE SPRING SPREADER

Application filed September 19, 1931. Serial No. 563,760.

This invention relates to spreading devices and more particularly to vehicle spring spreaders, although certain features thereof may be employed with equal advantage for other purposes.

It contemplates more especially the provision of a simple and dependable device for spreading the springs which sustain a vehicle body upon its chassis so as to afford proper lubrication and replacement or repair as the case may require or commercial practice dictate.

Numerous types of vehicle spring spreaders have heretofore been proposed, but these are intricate in construction or tedious in operation to the extent that their practical adoption has been delayed or thought unimportant.

It is essential that a tool of this character be portable, readily operable, and simple in construction so that it may perform a purpose in a far more advantageous manner than known tools or expedients which have a far greater use and are appreciably less expensive.

One object of the present invention is to simplify the construction and improve the operation of devices of the character mentioned.

Another object is to provide a simple device for creating a spreading urge upon vehicle springs.

Still another object is to provide an improved manipulating expedient for a spring spreading device of the character mentioned.

A further object is the provision of a novel adjusting member for improving the operation of vehicle spring spreaders.

A still further object is to provide a pawl and ratchet adjusting device for a spring spreading apparatus so as to enable a more effective manipulation thereof.

Still a further object is to provide a novel combination of old elements so as to perform an improved function without entailing much time or labor.

Other objects and advantages will appear from the following description of an illustrative embodiment of the present invention.

In the drawing:

Figure 1 is a front view and elevation of a device embodying features of the present invention.

Figure 2 is an end view of the device shown in Figure 1.

Figure 3 is a plane view of the device shown in Figure 1.

Figure 4 is a plane view of spring engaging bar constituting an element of the apparatus disclosed in the preceding figures.

Figure 5 is a sectional view taken substantially along line V—V of Figure 3.

The structure selected for illustration comprises a rigid frame 10, in this instance of substantially U-shaped configuration so as to enable the inversion thereof over the differential housing of an automobile or other vehicle. The frame 10 may be reenforced with suitable webs 11 along the lateral edges thereof to re-enforce the structure in accordance with recognized practice. As shown, the frame 10 terminates in aligned cylindric bosses 12 and 13 which are preferably tubular for the reception of aligned bar members 14 and 15 therein.

The aligned bar members 14 and 15 terminate in any suitably shaped extremities 16, in this instance wedged-shaped so as to effectively engage the extremities of a vehicle spring without possible disengagement during the tensioned urge imparted thereto. Other forms of extremities 16 may be employed or resorted to depending upon the dictates of commercial practice.

The bar member 14 is of tubular construction or cylindric configuration for telescopic engagement with the frame boss 12, it being retained therein by means of a set screw or other fastener 17 for detachable connection therewith. The bar member 15 is preferably provided with an exterior thread 18 thereon for meshing engagement with a correspondingly threaded housing 19 concentrically embracing the frame boss 13 in journaled association with a collar 20 which idles therebetween. The collar 20 is maintained against axial displacement by means of a set screw 21 provided, in this instance, with a reduced extremity 22 for registry with an annular groove 23 provided in the boss 13. Similarly, the threaded housing 19 is journaled on the sleeve 20 which has an annular groove 24 provided therein for the reception of the extremity of a set screw 25 corresponding in structure with the set screw 21. In this manner, the complemental parts 13, 19, and 20 are maintained connected for relative rotation responsive to the urge of a lever 26 preferably though not essentially formed integral with the collar 20 for radial extension therefrom.

A thrust bearing 27 of standard or approved construction is interposed between the frame boss 13 and housing 19 so as to enable the free rotation of the latter even under an appreciably sustained spring load. The bar member 15 is moved axially relative to the frame 10 responsive to the manipulation of the lever 26. To this end, the lever 26 has a pawl 28 pivoted to a slotted projection 29 formed on the lever 26 for connection thereto by means of a pin 30. In consequence thereof, the pawl 28 may swing through a substantial arc so that one or the other of its teeth 31 or 32 may engage a ratchet wheel 33. The ratchet wheel 33 is integrally or otherwise associated with the housing 19 in the path of the pawl 28 so that the peripheral teeth 34 thereof may be engaged by one or the other of the pawl teeth 31 or 32. A spring 35 is anchored to the lever projection 29 for connection to the center part of the pawl 28 so as to maintain one or the other of the teeth 31 or 32 in engagement with the ratchet teeth 34 depending upon the directional radial flip imparted to the pawl 28.

With the arrangement of parts above described it will be apparent that the frame member 10 may be disposed above the differential housing of a vehicle so that the aligned bars 14 and 15 will substantially engage the spring extremities of a vehicle for contact with the wedged extremity 16 thereof. Oscillatory ratcheting movement imparted to the lever 26 will rotate the threaded housing 19 which meshes with the threaded bar 15 to normally extend the latter or effect the retraction thereof depending upon the ratcheting direction. This will enable a vehicle spring to be spread so that replacement or repair is readily possible without entailing much time or labor. The ratcheting lever 26 is simple and very speedy in operation, thereby affording the manipulation of the device in a very efficient manner. In situations requiring a spread that is normally narrower than the minimum enabled by the complete retraction of the bar member 15, it is possible to eliminate the frame 10 by removing the bar members 14 and 15 therefrom. To this end, the diameter of the bar 14 is equivalent to the frame boss 13 so that the set screws 17 and 21 may be loosened to remove the frame 10. The bar 14 is telescoped within the collar 20 for the projection of the set screw 21 in an annular groove 36 provided in the extremity of the bar member 14. By so doing, the device is manipulated in an ordinary manner with the frame member 10 removed and rendering its application to the front spring of a vehicle which is ordinarily of less spread than the rear spring. It is thus apparent that a very simple and effective structure is provided for the manipulation of vehicle springs so that they may be repaired, replaced or effectively lubricated as commercial practice may require. Various changes may be made in the embodiment of the invention herein specifically described without departing from or sacrificing any of the advantages of the invention as defined in the appended claim.

I claim:

In a portable vehicle spring spreader, the combination with a rigid frame, of aligned bar members projecting in opposite directions from said frame, spring engaging extremities on said bar members, a tubular housing rotatively journalled on said frame, a ball bearing end thrust bearing disposed between said frame and tubular housing for confinement in the latter, a threaded shank on one of said bar members for adjustable extensible association with said tubular housing, lever means journalled on said frame for guiding confinement by said housing, a pawl pivoted to said lever means, and a ratchet wheel carried by said housing for cooperation with said pawl for operative connection with said threaded shank to effect the extension or retraction thereof relative to said frame.

In witness whereof, I subscribe my name.

GIDEON R. GAYNE.